United States Patent
Welker

(10) Patent No.: US 8,260,555 B2
(45) Date of Patent: *Sep. 4, 2012

(54) UPDATING INFORMATION REGARDING SECTIONS OF A STREAMER THAT ARE IN A BODY OF WATER

(75) Inventor: Kenneth E. Welker, Nesoya (NO)

(73) Assignee: WesternGeco L.L.C., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/182,475

(22) Filed: Jul. 14, 2011

(65) Prior Publication Data

US 2011/0270526 A1 Nov. 3, 2011

Related U.S. Application Data

(63) Continuation of application No. 11/737,627, filed on Apr. 19, 2007, now Pat. No. 8,060,314.

(51) Int. Cl.
*G01V 1/34* (2006.01)
(52) U.S. Cl. .............. 702/16; 702/14; 702/15; 702/17; 702/18; 367/20
(58) Field of Classification Search .............. 702/14–18; 367/20
See application file for complete search history.

(56) References Cited

U.S. PATENT DOCUMENTS

| | | | |
|---|---|---|---|
| 3,439,319 | A | 8/1968 | Whitfill, Jr. |
| 4,047,591 | A | 9/1977 | Ward |
| 5,883,856 | A | 3/1999 | Carroll |
| 6,681,867 | B2 | 1/2004 | Kragh et al. |
| 6,932,017 | B1 | 8/2005 | Hillesund |
| 8,060,314 | B2 | 11/2011 | Welker |
| 2005/0052951 | A1 | 3/2005 | Ray et al. |
| 2005/0180263 | A1 | 8/2005 | Lambert |
| 2005/0188988 | A1 | 9/2005 | Poole et al. |
| 2005/0209783 | A1 | 9/2005 | Bittleston |
| 2006/0260529 | A1 | 11/2006 | Hillesund |
| 2007/0041272 | A1 | 2/2007 | Hillesund |
| 2007/0127312 | A1 | 6/2007 | Storteig |

FOREIGN PATENT DOCUMENTS

| | | | |
|---|---|---|---|
| GB | 2339472 A | | 1/2000 |
| GB | 2425597 A | | 11/2006 |

OTHER PUBLICATIONS

International Search Report and Written Opinion of PCT Application No. PCT/US2008/058915 dated Jul. 29, 2009.

*Primary Examiner* — Drew A Dunn
*Assistant Examiner* — Hien Vo

(57) ABSTRACT

To perform a marine survey, a streamer is deployed into a body of water, where the streamer has plural first sensors to perform a subterranean survey. Indications are received from second sensors in corresponding sections of the streamer, where the indications are regarding which sections are in the body of water. Information is updated regarding which sections of the streamer are in the body of water in response to the received indications.

19 Claims, 4 Drawing Sheets

UPDATING INFORMATION REGARDING SECTIONS OF A STREAMER THAT ARE IN A BODY OF WATER

CROSS-REFERENCE TO RELATED APPLICATION

This application is a continuation of U.S. Ser. No. 11/737,627, U.S. Patent Publication No. 2008/0262738, filed Apr. 19, 2007, now U.S. Pat. No. 8,060,314 entitled "UPDATING INFORMATION REGARDING SECTIONS OF A STREAMER THAT ARE IN A BODY OF WATER," which is hereby incorporated by reference.

TECHNICAL FIELD

The information relates generally to performing a marine survey that includes updating information regarding which sections of a streamer are in a body of water.

BACKGROUND

Each of a marine seismic streamer and seabed cable is an elongate cable-like structure, which can be several thousands of meters long. The streamer or cable includes arrays of acoustic sensors (e.g., hydrophones) and associated electronic equipment along the length of the streamer. The acoustic sensors are used to perform marine and seabed seismic surveying.

Typically, a number of streamers are towed by a sea vessel to perform a marine seismic survey, while a seabed cable is deployed from the sea vessel and laid on the sea floor. The streamers and seabed cables are deployed from the sea vessel, typically from the aft of the sea vessel. Each streamer or cable is unwound from a reel or spool for deployment into the water. As a streamer or cable is deployed, it is useful to determine which sections of the streamer or cable are in the body of water. Typically, this is accomplished by using RFID (radio frequency identifier) readers positioned on the aft deck to detect RFID tags on the sections that are being deployed.

An issue associated with using this mechanism to detect which sections of the streamer are in the water is that there is typically a lot of activity at the aft desk of a sea vessel. Such activity may damage the RFID reader, such as due to accidental impact of other equipment with the RFID reader.

Another issue associated with using an RFID reader to read tags on the streamer or cable is that the RFID reader has to be far enough away from the streamer/cable reel and other sections of the streamer or cable to ensure that the RFID reader only detects the section that is being deployed. Such a requirement places constraints on the building of an RFID deployment system.

SUMMARY

In general, according to an embodiment, a method of performing a marine survey includes deploying, into a body of water, a streamer having plural first sensors for performing a subterranean survey, and receiving, from second sensors in corresponding sections of the streamer, indications regarding which sections are in the body of water. Information regarding which sections of the streamer are in the body of water is updated in response to the received indications.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
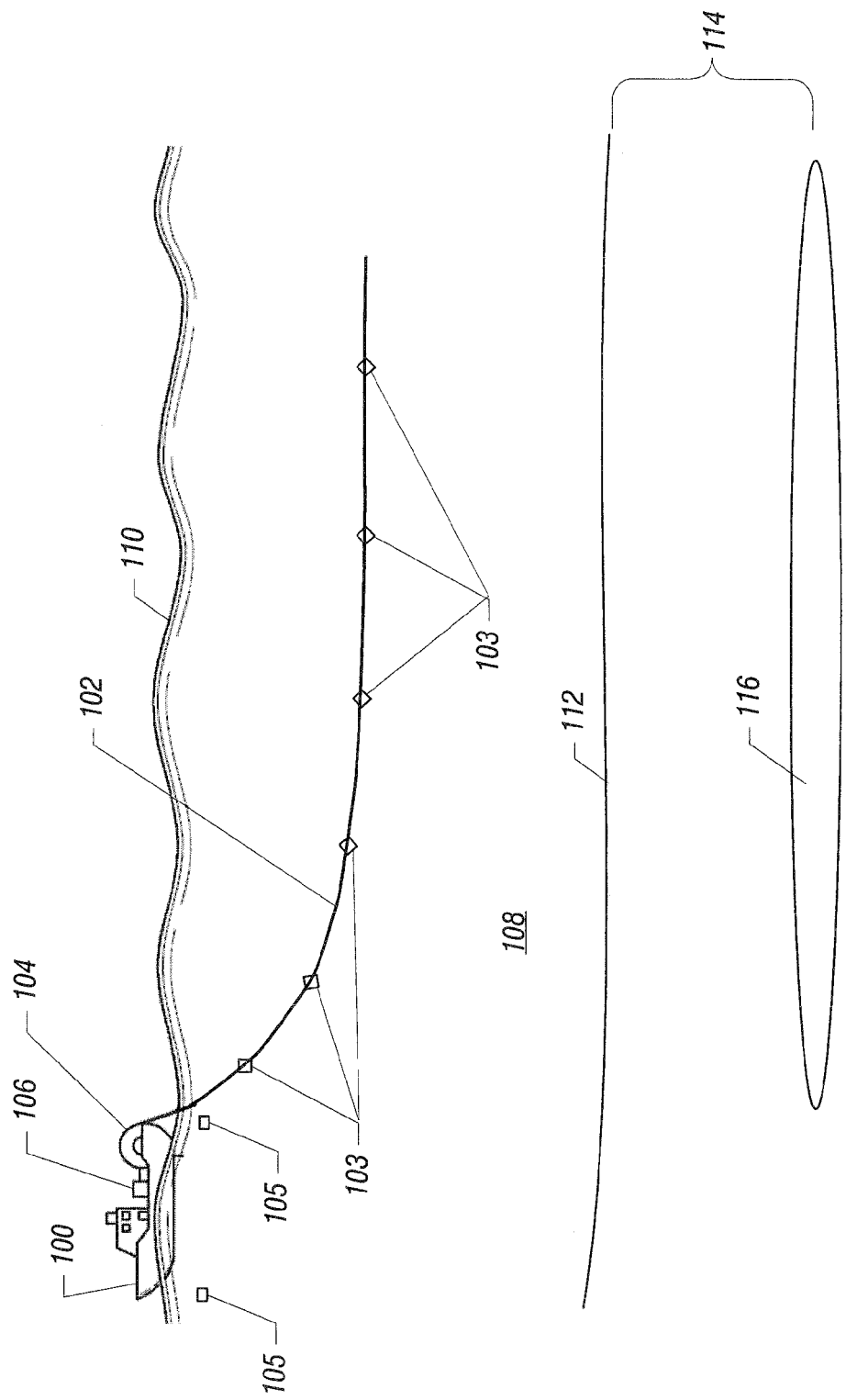
FIG. 1 illustrates a sea vessel that deploys multiple streamers, according to an example.

FIG. 1 illustrates a sea vessel 100 that has a reel or spool 104 for deploying a streamer 102, which is a cable-like structure having a number of sensors 103 for performing a subterranean survey of a subterranean structure 114 below a sea floor 112. A portion of the streamer 102, and more particularly, the sensors 103, are deployed in a body of water 108 underneath a sea surface 110. The streamer 102 is towed by the sea vessel 100 during a seismic operation. In an alternative implementation, instead of using a streamer that is towed in the water by the sea vessel 100, a seabed cable can be used instead, where the seabed cable is deployed from a reel on the sea vessel and laid on a sea floor 112. In the following, the term "streamer" is intended to cover either a streamer that is towed by a sea vessel or a seabed cable laid on the sea floor 112.

Also depicted in FIG. 1 are a number of signal sources 105 that produce signals propagated into the body of water 108 and into the subterranean structure 114. The signals are reflected from layers in the subterranean structure 114, including a resistive body 116 that can be any one of a hydrocarbon-containing reservoir, a fresh water aquifer, an injection zone, and so forth. Signals reflected from the resistive body 116 are propagated upwardly toward the sensors 103 for detection by the sensors. Measurement data is collected by the sensors 103, which can store the measurement data and/or transmit the measurement data back to a control system 106 on the sea vessel 100.

The sensors 103 can be seismic sensors, which are implemented with acoustic sensors such as hydrophones or geophones. The signal sources 105 can be seismic sources, such as air guns or explosives. In an alternative implementation, the sensors 103 can be electromagnetic (EM) sensors 103, and the signal sources 105 can be EM sources that generate EM waves that are propagated into the subterranean structure 114.

Although not shown in FIG. 1, the streamer 102 further includes additional sensors (e.g., depth sensors), which are used to detect a position of respective sections of the streamer 102. In accordance with some embodiments, data from these additional sensors are sent back to the control system 106 to allow the control system 106 to update information regarding which sections of the streamer 102 are in the body of water 108, and which sections of the streamer 102 are outside the body of water.

Figure 2:
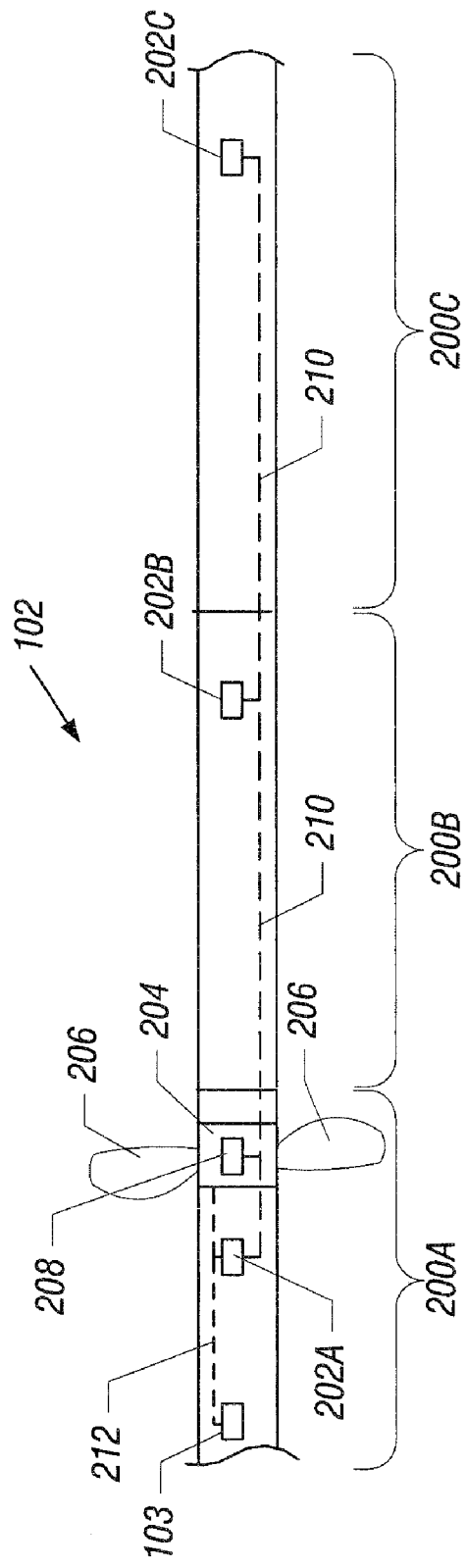
FIG. 2 illustrates a portion of the streamer, according to an example embodiment.

FIG. 2 shows a portion of the streamer 102, including sections 200A, 200B, and 200C. The section 200A includes a corresponding sensor 103 (such as a seismic sensor) for detecting subterranean features. The sensor 103 can be deployed once every few sections of the streamer 102 in one example. Alternatively, each section can have a corresponding sensor 103 for detecting subterranean features.

In the ensuing discussion, reference is made to seismic sensors. Note, however, in other implementations, the sensors used for detecting subterranean features can be EM sensors. Note also that the arrangement in FIG. 2 is an example arrangement. Different arrangements can be used in other implementations. The streamer 102 includes additional equipment that is not shown in FIG. 2.

The section 200A further includes a second sensor 202A, which in some embodiments is a depth sensor to detect the depth of the section of the streamer 102 in the body of water 108. Each of the other sections 200B, 200C depicted in FIG. 2 also includes a corresponding second sensor 202B, 202C (e.g., depth sensors).

The section 200A further includes a steering device 204 to help steer the streamer 102 in the body of water. The steering device 204 can include control surfaces 206 (in the form of blades or wings) that are rotatable about a longitudinal axis of the streamer 102 to help steer the streamer 102 in a desired lateral direction. The steering device 204 can be provided once every few sections of the streamer 102.

In some implementations, the steering device 204 includes a battery (or other power source) 208 that is used to power the steering device 204. The battery 208 can also be used to power the depth sensor 202A in the section 200A, as well as depth sensors 202B, 202C in other sections 200B, 200C that are relatively close to the section 200A containing the steering device 204. Power from the battery 208 is provided over electrical conductor(s) 210 to the depth sensors 202A, 202B, 202C. In alternative implementations, power can be provided from an alternative source, such as from the sea vessel 100 over an electrical cable 212 (or fiber optic cable) that is routed through the streamer 102. To derive power from a fiber optic cable, each sensor 202 would include a conversion circuit to convert optical waves into electrical power.

In accordance with some embodiments, the depth sensors 202 (202A, 202B, 202C shown) are used to detect which sections 200 of the streamer 102 are deployed in the body of water 108. The depth sensors 202 provide data regarding whether corresponding sections are in the body of water 108 by communicating the data over a communications link (e.g., electrical or fiber optic cable) 212 that is run along the length of the streamer 102 to the reel 104 on the sea vessel 100. The data provided from the depth sensors 202 are received by the control system 106.

Based on the data provided by the depth sensors 202, the control system 106 is able to update information regarding which sections of the streamer 102 are deployed in the body of water 108 and which sections of the streamer 102 are outside the body of water 108. The control system 106 is able to update a visual representation of a spread in response to the received data. Note that the visual representation of the spread is updated continually as information is continually received from the depth sensors 202. A spread refers to an arrangement of seismic sensors deployed in the body of water 108 to perform a seismic survey. A spread typically includes a number of streamers.

As streamer sections are powered up after the depth sensor detects that they are in the water, the positioning system will be enabled. Typically through a transformation of measurement information (including GPS antenna equipped floats, acoustic transmitters and receivers, and compasses providing directions) to the position domain, the deployed streamer sections can be visualized with a fairly accurate spatial relation. Coordinate estimates of points along the streamer are used to guide the streamer steering devices.

The visual representation of the spread can be in the form of a map or other diagram that includes icon elements representing respective sections (and sensors) of the streamers. Some indicator can be associated with each section in the visual representation to indicate whether or not the particular section is in the body of water 108. The indicator can be in the form of text, an icon, or a different color (e.g., red to indicate out of water and green to indicate in water). The indicator can have a first state to indicate that the respective section is in the water, and a second state to indicate that the respective section is out of the water. The visual representation can be in the form of a graphical user interface (GUI) screen. Alternatively, the visual representation can be in text format that lists which sections of which streamers are in water and which are not in water.

Based on the information contained in the updated visual representation of the spread, an operator on the sea vessel 100 can perform operations with respect to the sections of the streamers. For example, it is desirable that sections of a streamer that are outside the body of water 108 not be powered when the streamer 102 is being deployed into the water (to avoid over-heating problems). Thus, the operator can disable power to sections of the streamer that are indicated by the visual representation as being outside the body of water 108, and to activate power to equipment in the sections of the streamer that are indicated to be inside the body of water 108. The operator can activate/deactivate control elements of a GUI provided by the control system 106 to activate/disable power to equipment in the sections of the streamer 102. Alternatively, the control system 106 can include actual physical buttons that are actuated by the operator to control power to the sections of the streamer 102.

Among the equipment powered are steering devices 204, which are used to navigate the streamer 102. Activating power to equipment in a section of the streamer refers to activating power to equipment other than the depth sensor (since the depth sensor) has to be activated to allow for indications to be communicated to the control system 106 to indicate whether or not a particular section is in the body of water 108.

Data pertaining to whether or not particular sections of the streamer are in or out of the water can also be used in the reverse direction, when the streamer 102 is being retrieved from the body of water 108. This information helps the operator determine which sections are to be powered off and which sections are to remain activated.

The depth sensors 202 are thus used for a dual purpose: (1) to detect a depth of sections of the streamer 102 during normal operation (e.g., a seismic survey operation); and (2) to detect sections that are in the body of water 108 so that such sections can be powered.

Figure 3:
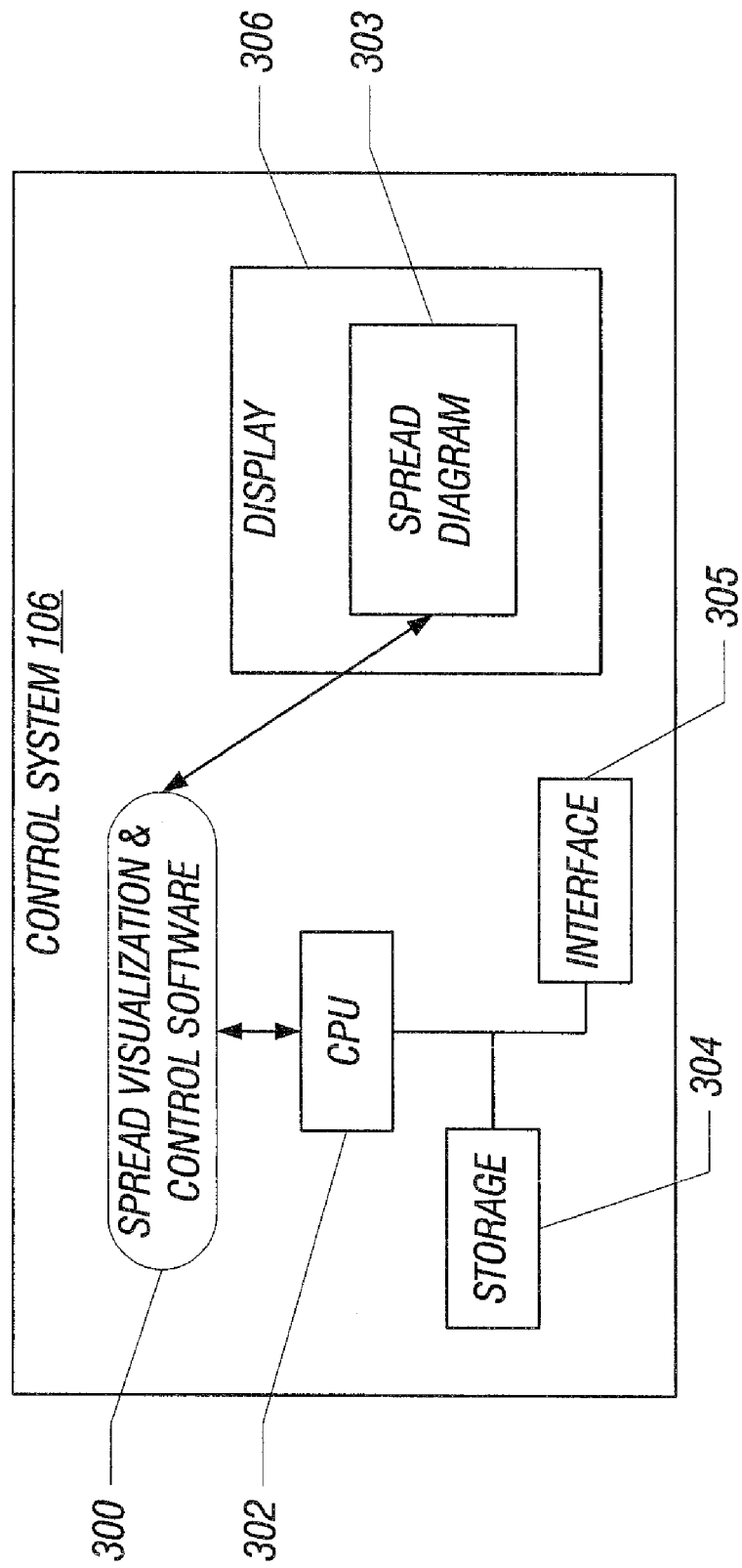
FIG. 3 is a block diagram of a control system, according to an embodiment.

FIG. 3 is a block diagram of an example arrangement of the control system 106. The control system 106 includes spread visualization and control software 300 that is executable on one or more central processing units (CPUs) 302. The spread visualization and control software 300 controls the display of a spread diagram 303 in a display device 306. The spread diagram 303 can be in the form of a GUI screen to visually display GUI elements representing sections of the streamers of a particular spread.

The CPU(s) 302 is (are) connected to a storage 304 and a communications interface 305 to communicate with the communications link of the streamer 102.

An operator can also use the spread visualization and control software 300 to control activation and disabling of power to sections of a streamer. The operator can perform the power activation and disabling using GUI control elements displayed in the display device 306, or using actual physical control buttons.

Figure 4:
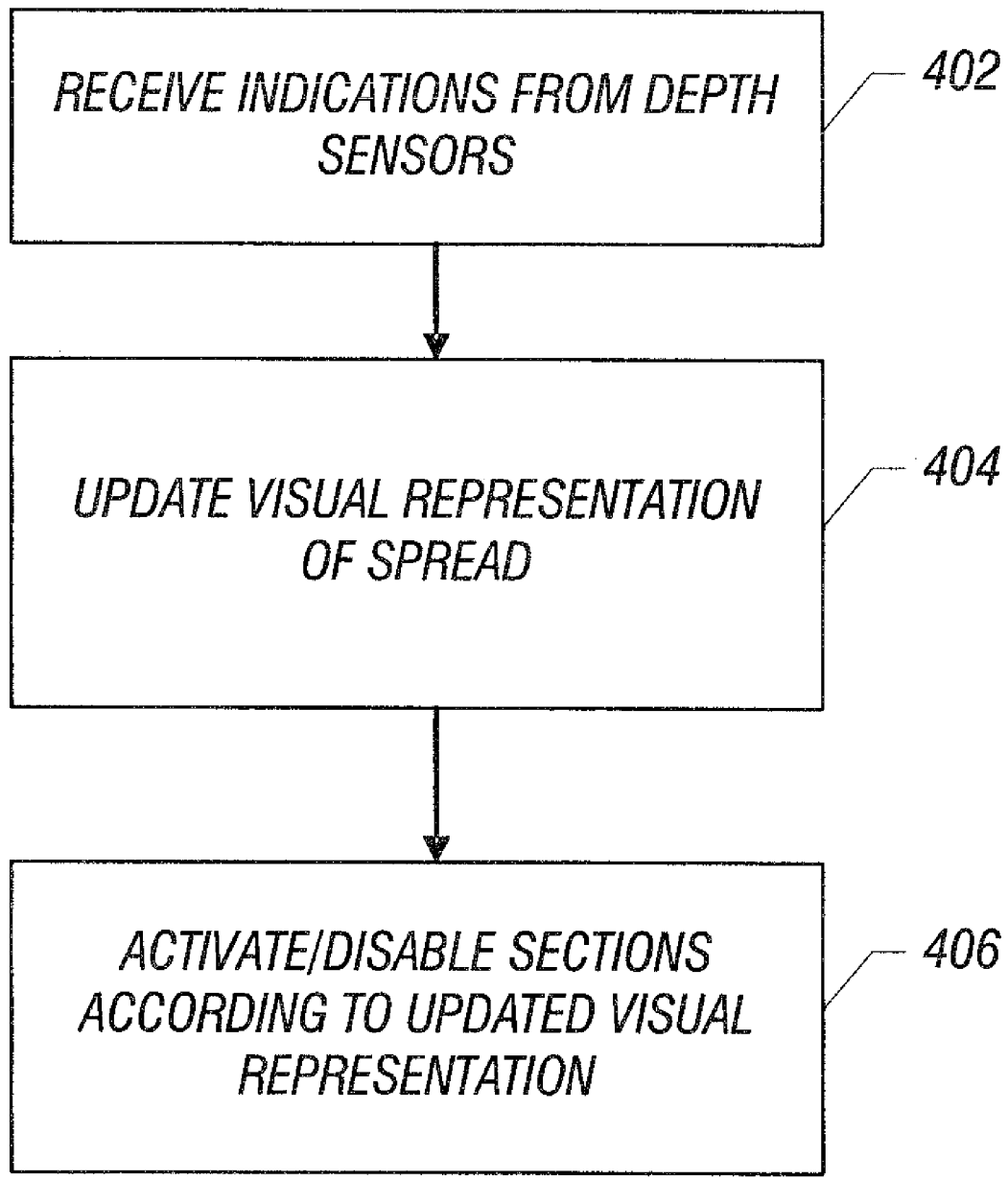
FIG. 4 is a flow diagram of a process performed by the control system of FIG. 3, according to an embodiment.

FIG. 4 is a flow diagram of a process performed by the control system 106 according to an embodiment. As a streamer 102 is being deployed from the sea vessel 100 into the body of water 108 (or being retrieved from the body of water 108 back onto the reel 104), the control system 106 receives (at 402) indications from depth sensors 202 in the streamer sections. The indications can be received on a periodic basis. The visual representation of the spread is updated (at 404) in response to the received depth sensors. The visual representation of the spread is updated to indicate which streamer sections are in the body of water 108 and which streamer sections are outside of the body of water 108.

The sections of the streamer are then activated or disabled (at 406) according to the updated visual representation. Note that although reference has been made to an operator activating or disabling sections of the streamer based on the visual representation, it is noted that the control system 106 can automatically disable or activate sections of the streamer based on information from the depth sensors indicating whether or not the particular sections are in the body of water.

Instructions of software described above (including spread visualization and control software 300 of FIG. 3) are loaded for execution on a processor (such as one or more CPUs 302 in FIG. 3). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of performing a marine survey, comprising:
    deploying, into a body of water, a streamer having plural first sensors for performing a subterranean survey;
    receiving, from second sensors in corresponding sections of the streamer, indications regarding which sections are in the body of water;
    updating information regarding which sections of the streamer are in the body of water and which other sections of the streamer are outside the body of water, in response to the received indications;
    providing, by a control system based on the updated information, power to activate equipment in the sections of the streamer in the body of water; and
    disabling, by the control system based on the updated information, power to equipment in the sections of the streamer outside the body of water.

2. The method of claim 1, wherein updating the information comprises updating a visual representation of a spread including the streamer.

3. The method of claim 2, wherein updating the visual representation of the spread comprises updating displayed indicators of which sections of the streamer are in the body of water and which sections of the streamer are outside the body of water.

4. The method of claim 3, wherein the spread further comprises at least another streamer having first sensors for performing a subterranean survey, and second sensors, the method further comprising:
    receiving indications from the second sensors of the at least another streamer regarding which sections of the at least another streamer are in the body of water; and
    updating the visual representation of the spread in response to the received indications from the second sensors of the at least another streamer.

5. The method of claim 1, wherein providing power to activate the equipment in the sections of the streamer in the body of water comprises providing power to activate one or more steering devices in the streamer.

6. The method of claim 1, wherein receiving the indications from the second sensors comprises receiving the indications from depth sensors.

7. The method of claim 1, wherein deploying the streamer having the plural first sensors comprises deploying the streamer having plural acoustic sensors.

8. The method of claim 1, wherein deploying the streamer having the plural first sensors comprises deploying the streamer having plural seismic sensors.

9. The method of claim 1, wherein deploying the streamer having the plural first sensors comprises deploying the streamer having plural electromagnetic sensors.

10. The method of claim 1, further comprising:
    retrieving the streamer from the body of water onto a reel, wherein receiving the indications from the second sensors and updating the information is performed also during retrieving of the streamer.

11. The method of claim 1, wherein the indications are received from the second sensors on a periodic basis, and wherein the information regarding which sections are in the body of water and which sections are outside the body of water is updated repeatedly with the periodic receptions of the indications from the second sensors.

12. The method of claim 1, wherein deploying the streamer comprises deploying the streamer towed by a sea vessel.

13. The method of claim 1, wherein deploying the streamer comprises deploying a seabed cable laid on a sea floor.

14. A control system to control deployment of a streamer into a body of water, comprising:
    a processor to:
        receive data from sensors in the streamer that contains equipment to perform a subterranean survey;
        update information regarding which sections of the streamer are in the body of water and which sections of the streamer are outside the body of water;
        cause provision of power to activate equipment in the sections of the streamer in the body of water according to the updated information; and
        cause disabling of power to equipment in the sections of the streamer outside the body of water according to the updated information.

15. The control system of claim 14, wherein the received data from the sensors comprises data from depth sensors.

16. The control system of claim 14, further comprising:
    a display device to present a visual representation of the sections of the streamer.

17. The control system of claim 16, wherein the visual representation of the sections of the streamer contains representations of one of seismic sensors and electromagnetic sensors for performing the subterranean survey.

18. An article comprising at least one non-transitory computer-readable storage medium storing instructions that when executed cause a computer to:
- receive data from sensors in a streamer that contains equipment to perform a subterranean survey;
- update information regarding which sections of the streamer are in a body of water and which sections of the streamer are outside the body of water;
- cause provision of power to activate equipment in the sections of the streamer in the body of water according to the updated information; and
- cause disabling of power to equipment in the sections of the streamer outside the body of water according to the updated information.

19. The article of claim 18, wherein the instructions when executed cause the computer to further display control elements in a visual representation of the streamer to allow user input for activating and disabling power to respective sections of the streamer.

* * * * *